United States Patent
Saraya et al.

(10) Patent No.: US 10,229,211 B2
(45) Date of Patent: *Mar. 12, 2019

(54) UPDATING HIGH LEVEL NESTED FILTERS ACCORDING TO LOW LEVEL FILTER CHOICES

(71) Applicant: International Business Machines Corporation, Armonk, NY (US)

(72) Inventors: Siddharth K. Saraya, Raniganj (IN); Alok K. Singh, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 304 days.

This patent is subject to a terminal disclaimer.

(21) Appl. No.: 15/041,045

(22) Filed: Feb. 11, 2016

(65) Prior Publication Data

US 2017/0235833 A1    Aug. 17, 2017

(51) Int. Cl.
*G06F 17/30* (2006.01)
*G06F 3/0484* (2013.01)

(52) U.S. Cl.
CPC .... *G06F 17/30867* (2013.01); *G06F 3/04847* (2013.01); *G06F 17/30442* (2013.01); *G06F 17/30696* (2013.01); *G06F 17/30967* (2013.01)

(58) Field of Classification Search
CPC ......... G06F 17/30389; G06F 17/30395; G06F 17/30398; G06F 17/30994; G06F 17/30696; G06F 17/30442; G06F 17/30967
USPC .................................................. 707/722, 732
See application file for complete search history.

(56) References Cited

U.S. PATENT DOCUMENTS

| | | | | |
|---|---|---|---|---|
| 6,460,025 | B1 * | 10/2002 | Fohn | G06F 17/30994 707/E17.142 |
| 6,912,505 | B2 * | 6/2005 | Linden | G06Q 30/02 705/14.53 |
| 7,836,051 | B1 * | 11/2010 | Mason | G06F 17/30867 707/734 |
| 9,646,049 | B1 * | 5/2017 | Saraya | G06F 17/30442 |
| 2009/0083209 | A1 | 3/2009 | Corl, Jr. et al. | |
| 2011/0191303 | A1 | 8/2011 | Kaufman et al. | |
| 2013/0091153 | A1 | 4/2013 | Gitelman | |
| 2014/0040806 | A1 | 2/2014 | Anderson et al. | |
| 2014/0304282 | A1 | 10/2014 | Eide et al. | |

FOREIGN PATENT DOCUMENTS

WO    2008055113 A2    5/2008

OTHER PUBLICATIONS

Saraya et al., "Updating High Level Nested Filters According to Low Level Filter Choices", U.S. Appl. No. 15/208,740, filed Jul. 13, 2016, 22 pages.

IBM Appendix P, list of patents and patent applications treated as related, Jul. 13, 2016, 2 pages.

* cited by examiner

*Primary Examiner* — Vincent F Boccio
(74) *Attorney, Agent, or Firm* — Gilbert Harmon, Jr.

(57) ABSTRACT

A method includes receiving a user inputted lower-level hierarchical filter key, processing filter key relational data to identify higher-level filter criteria keys associated with the user inputted lower-level hierarchical filter key, updating higher-level filter criteria to include the identified higher-level filter criteria keys, and generating a list of results according to the updated filter criteria. A computer program product and computer system corresponding to the method are also disclosed.

20 Claims, 4 Drawing Sheets

UPDATING HIGH LEVEL NESTED FILTERS ACCORDING TO LOW LEVEL FILTER CHOICES

BACKGROUND OF THE INVENTION

The present invention relates generally to the field of search engines, and more specifically to hierarchical, or nested, filter searches.

Search engines may leverage a number of techniques to efficiently narrow a set of data items down to a list of appropriate results. One such technique utilizes hierarchical filters, in which lower order filters are populated according to existing higher order filters. This enables a list of results resulting from the search to be narrowed as each level filter is applied, allowing a user to continually add filter values until a manageable set of results is created according to the applied filters.

SUMMARY

A method includes receiving a user inputted low level hierarchical filter key, processing filter key relational data to identify higher-level filter criteria keys associated with the user inputted lower-level hierarchical filter key, updating higher-level filter criteria to include the identified higher-level filter criteria keys, and generating a list of results according to the updated filter criteria. A computer program product and computer system corresponding to the method are also disclosed.

DETAILED DESCRIPTION

In a hierarchical filter environment, a user may be unable to manually add choices directly at any lower level of the applied filter. When a highest level filter is applied, it limits a user's choices when selecting a next level filter. For example, consider geographical filters. If a user first selects a continent (North America), the user may then be prompted to select a country as the next level filter. Only countries in North America will be provided to the user as choices for this filter. However, in some cases a user may desire to amend the search to include a specific result that does not fit within the currently applied filters. With the existing structures, a user may be unable to do so, as the user will not be provided choices that do not fit within the current filters. That is, if the user has selected North America as a filter, and would also like to include results associated with the city Paris, currently available techniques require the user to go back and amend all the previously selected filters so they will not exclude Paris. The embodiments disclosed herein enable a user to manually enter a lower level filter value, such as Paris, and the higher level filters will be automatically updated with the appropriate information corresponding to the manually entered value.

Figure 1:
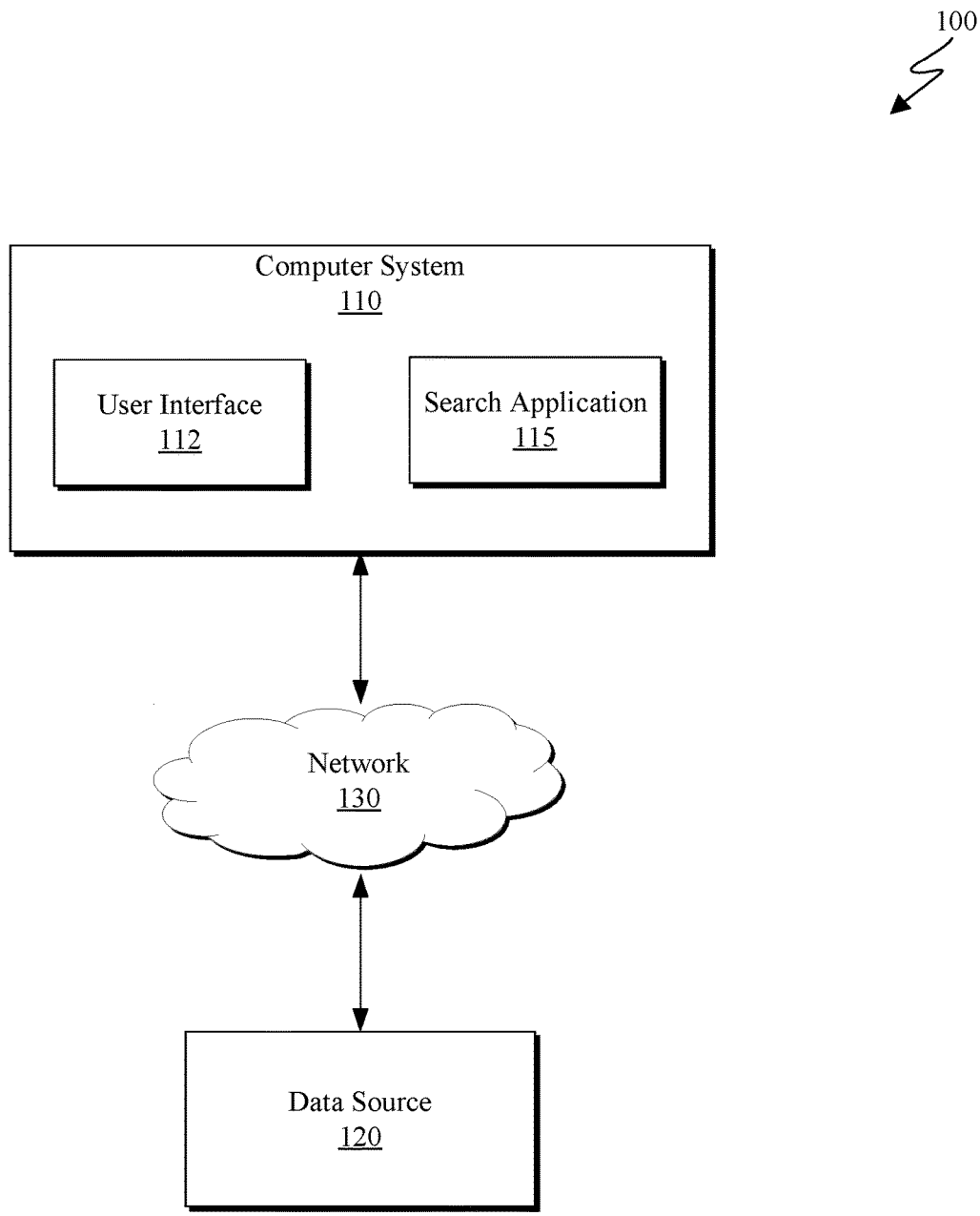
FIG. 1 is a block diagram depicting one example of a data filtering system in accordance with some embodiments of the present invention.

FIG. 1 is a block diagram depicting one example of a data filtering system 100 in accordance with some embodiments of the present invention. As depicted, data filtering system 100 includes computer system 110, data source 120, and network 130. Data filtering system 100 is one example of an environment in which a hierarchical filter revision method may be applied.

Computer system 110 can be a desktop computer, a laptop computer, a specialized computer server, or any other computer system known in the art. In some embodiments, computer system 110 represents a computer system utilizing clustered computers and components to act as a single pool of seamless resources. In general, computer system 110 is representative of any electronic device, or combination of electronic devices, capable of executing machine-readable program instructions, as described in greater detail with regard to FIG. 4.

Computer system 110 includes user interface 112 and search application 115. User interface 112 may be any interface through which a user can enter and edit a search query. In one embodiment, user interface 112 corresponds to a graphical user interface (GUI). Search application 115 may be any application capable of executing a search query on one or more data sources such as data source 120. In some embodiments, search application 115 is further configured to display results of the search query to a user via a display, such as display 420 described with respect to FIG. 4.

Data source 120 may be any source containing data that can be searched via search application 115. In some embodiments, data source 120 is a database. While the depicted embodiment refers to a single data source 120, it should be appreciated that data source 120 may be representative of any number of sources through which data is available to computer system 110 via search application 115.

Network 130 can be, for example, a local area network (LAN), a wide area network (WAN) such as the Internet, or a combination of the two, and include wired, wireless, or fiber optic connections. In general, network 130 can be any combination of connections and protocols that will support communications between data source 120 and computer system 110 in accordance with an embodiment of the present invention.

Figure 2:
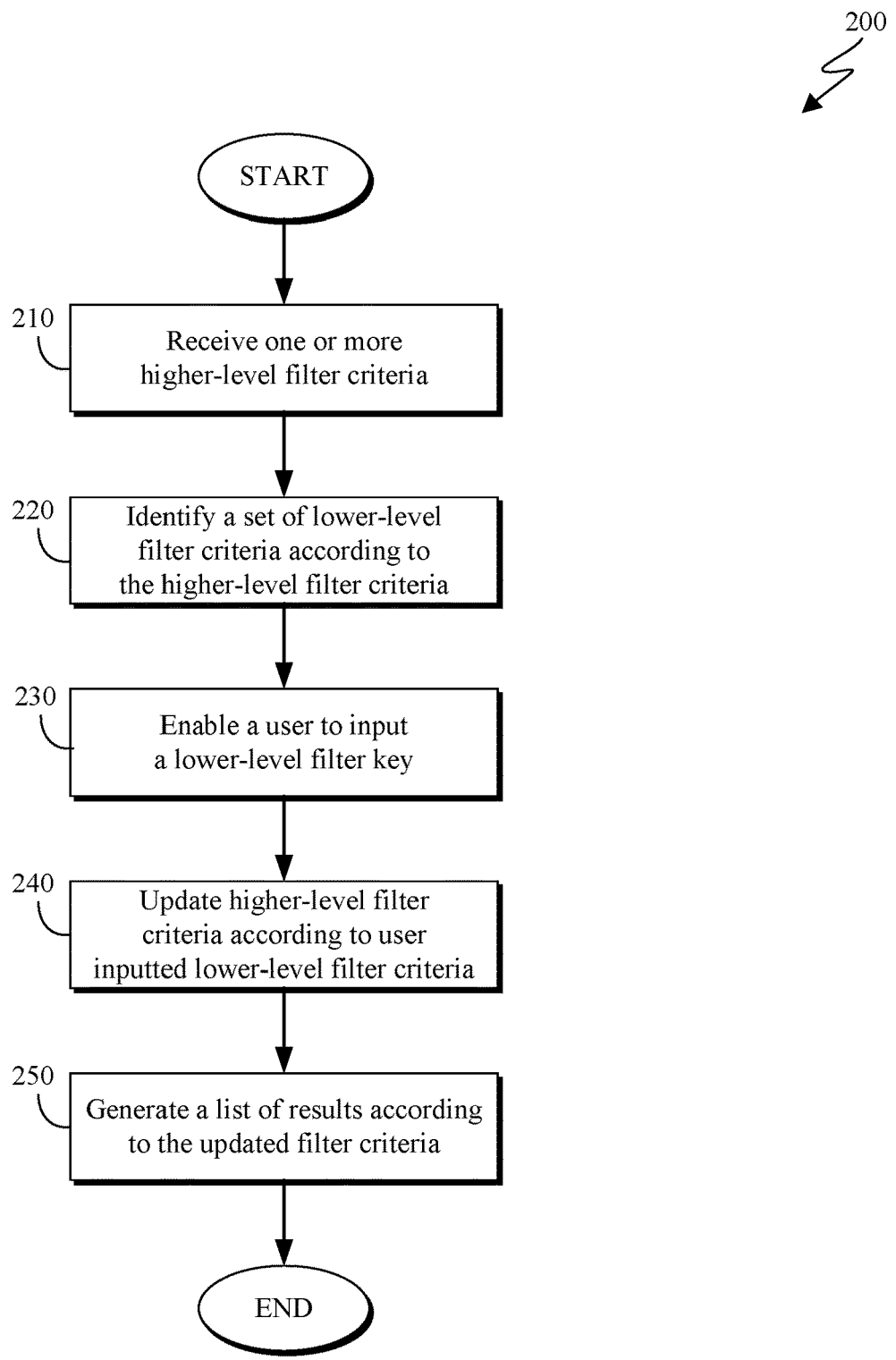
FIG. 2 is a flowchart depicting one example of a hierarchical filter revision method in accordance with at least one embodiment of the present invention.

FIG. 2 is a flowchart depicting one example of a filter revision method 200 in accordance with at least one embodiment of the present invention. As depicted, filter revision method 200 includes receiving (210) one or more higher-level filter criteria, identifying (220) a set of lower-level filter criteria options according to the higher-level filter criteria, enabling (230) a user to manually input a lower-level filter key, updating (240) the higher-level filter criteria according to the user inputted lower-level filter key, and generating (250) a list of results according to the updated filter criteria. Filter revision method 200 may enable a filtering hierarchy to be updated automatically in response to a user inputted low filter key.

Receiving (210) one or more higher-level filter criteria may include receiver user indicated selections of higher-level filter criteria values. In one embodiment, receiving (210) one or more higher-level filter criteria includes receiving one or more higher-level filter keywords that will be used to filter a set of search results. In some embodiments, multiple tiers of higher-level filters may be employed. For example, if a geographic search is being executed, and results are filtered using filters for a continents, countries, and cities, continents and countries would be considered higher-level filter criteria and cities would be considered the lower-level filter criteria. Receiving (210) one or more higher-level filter criteria may further include receiving relational data indicating one or more sets of lower level criteria which are associated with each higher-level criteria key and can be applied to further limit search results. With respect to the Identifying (220) a set of lower-level filter criteria options according to the higher-level filter criteria may include determining one or more lower-level filter criteria options that correspond to the received higher-level filter criteria. As used herein, lower-level filter criteria refers to the filter criteria which is applied last. The identified lower-level filters options may be limited by the previously received higher-level filter criteria. For example, if a search is being conducted on a database of magazine articles, the user may use a higher-level filter to include only search results from a specific genre, such as sports. From there, a lower level filter can be applied to focus on a specific magazine, and the user may be presented with a list of sports magazines. The user can select one or more of these magazines to further filter the search results. For this lower-level filter, only options that meet the higher-level filter criteria will be presented; that is, the user will only have the option to select sports magazines at this point.

Enabling (230) a user to input a lower-level filter key may include providing a user interface through which the user can input a lower-level filter key that is not an available choice based on the applied higher-level filters. For example, with respect to the previously discussed example relating to magazines, if a user has applied a higher-level filter narrowing the results to only sports magazines, and a lower-level filter narrowing the results to only articles from Sports Magazine X, the results displayed will only be articles from Sports Magazine X. The user could then decide to include a specific magazine from outside of the sports genre, such as a magazine that covers a variety of topics including sports (Generic Magazine Y). Generic Magazine Y will not show up as a lower-level filter choice because it does not fit into the higher-level filter genre "Sports", so the user is provided with an interface through which he/she can input "Generic Magazine Y" manually. In some embodiments, the interface provided corresponds to a graphical user interface.

In some embodiments, a user may opt to input a lower-level filter key before any higher-level filters are applied. In these embodiments, enabling (230) a user to input a lower-level filter key is the first step that occurs, as there may be no existing higher-level filter criteria to receive or process.

Updating (240) the higher-level filter criteria according to the user inputted lower-level filter key may include amending the higher-level filter criteria entries to accommodate the manually entered lower-level filter key. In some embodiments, updating (240) the higher-level filter criteria includes processing the received relational data to find the higher-level filter keys that are associated with the manually entered lower-level filter key. Updating (240) the higher-level filter criteria may further include amending the existing filters to include these higher-level filter keys. In the discussed example, the higher-level filter criteria is updated to include the genre associated with Generic Magazine X as indicated by the received relational data. In some embodiments, updating (240) the higher-level filter criteria comprises creating a second filter hierarchy to be used in conjunction with the existing hierarchical filter.

Generating (250) a list of results according to the updated filter criteria may include compiling a list of results that meet the filter criteria as updated with respect to the user entered lower-level filter key. The list may be generated by executing a search according to the updated filter criteria and creating a list of appropriate results. In some embodiments, the generated list of results may be displayed to the user. Depending on the data source that is searched, the generated list of results may be database entries, hyperlinks to web content, local file destinations, or any other searchable data content. It should be appreciated that a list of results may be generated prior to this step with respect to any level filter that has been applied, but a list of results updated in light of the user entered lower-level filter key is not be generated until this point.

Figure 3:
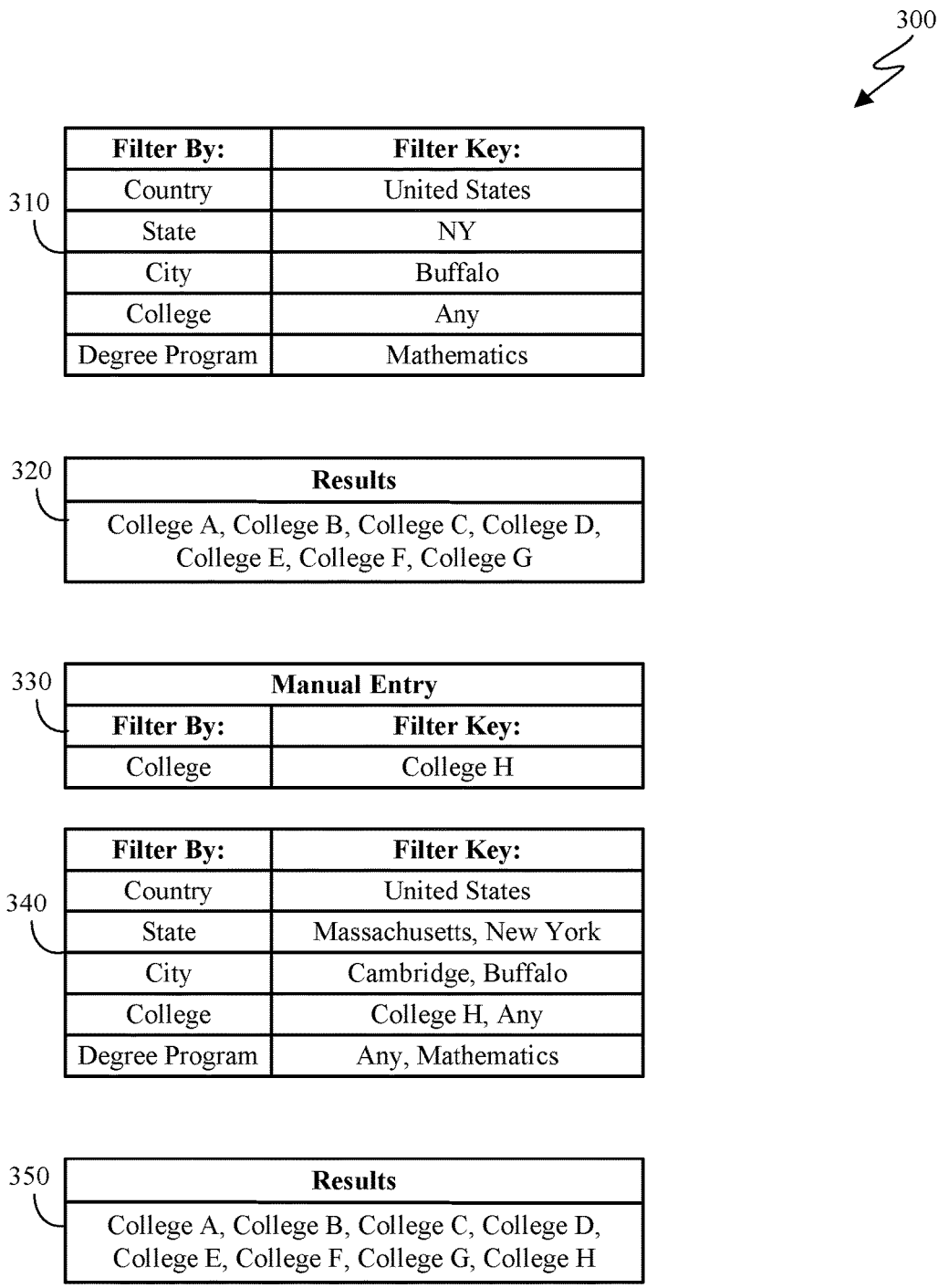
FIG. 3 depicts an example of a search interface in accordance with one embodiment of the present invention.

FIG. 3 depicts an example of a search interface 300 in accordance with one embodiment of the present invention. As depicted, search interface 300 includes an initial filtering hierarchy 310, an initial results list 320, a manual entry interface 330, an automatically generated filtering hierarchy 340, and a final results list 350. Search interface 300 is an example of an interface that enables a hierarchical filter to be updated according to a manually entered lower-level filter key.

Initial filtering hierarchy 310 is an example of a hierarchical filter prior to revision in light of a manually entered lower-level filter key. The depicted hierarchical filter may correspond to a search being executed to provide informational materials about colleges. As depicted, initial filtering hierarchy 310 includes five levels of filtering. The first three filters, labeled "Country", "State", and "City", filter results according to geographical information, with each level narrowing the geographic area to which the search results will correspond. These three filters are hierarchical, as the options for "State" and "City" will be defined according to the selections for the higher filters. As indicated, the selected filter values will yield search results corresponding to Buffalo, N.Y. in the United States. The fourth filter listed, labeled "College", will be populated with choices that correspond to colleges that meet the geographic criteria as indicated by the filters above. As indicated, the selected filter values will yield search results corresponding to any college in the Buffalo, N.Y. area. The fifth filter listed, labeled "Degree Program", will be populated with choices that correspond to degree programs offered by the colleges that meet the criteria as indicated by the filters above. Executing this search will yield an initial results list 320 comprising colleges in the Buffalo, N.Y. area that offer mathematics as a degree program. The entries in initial results list 320 may be hyperlinks to content corresponding to each named college.

Manual entry interface 330 is an example of an interface through which a user can enter a lower-level filter key that does not fit within the limitations as imposed by the initial filtering hierarchy 310. As depicted, manual entry interface 330 includes a "Filter By" section and a "Filter Key" section, mirroring the sections that exist in the filtering hierarchy 310. Manual entry interface 330 is an interface that allows a user to enter a specific filter key. In some embodiments, a manual entry interface may enable a user to provide text to indicate a filter key. In the depicted embodiment, the user has utilized manual entry interface 330 to amend the search to include a specific college, College H. College H may not meet the filter requirements as implemented thus far, and therefore the higher level filters must be updated to enable search results corresponding to College H to be included.

Updated filtering hierarchy 340 depicts a filter hierarchy updated to include the filter keys that are added to the hierarchical filter. In the depicted embodiment, the filter keys corresponding to the manually added filter key "College H" have been utilized to create a hierarchical filter capable of creating an updated results list 350 that will include the previously identified results from results list 320 as well as the results stemming from the manually entered filter key.

Figure 4:
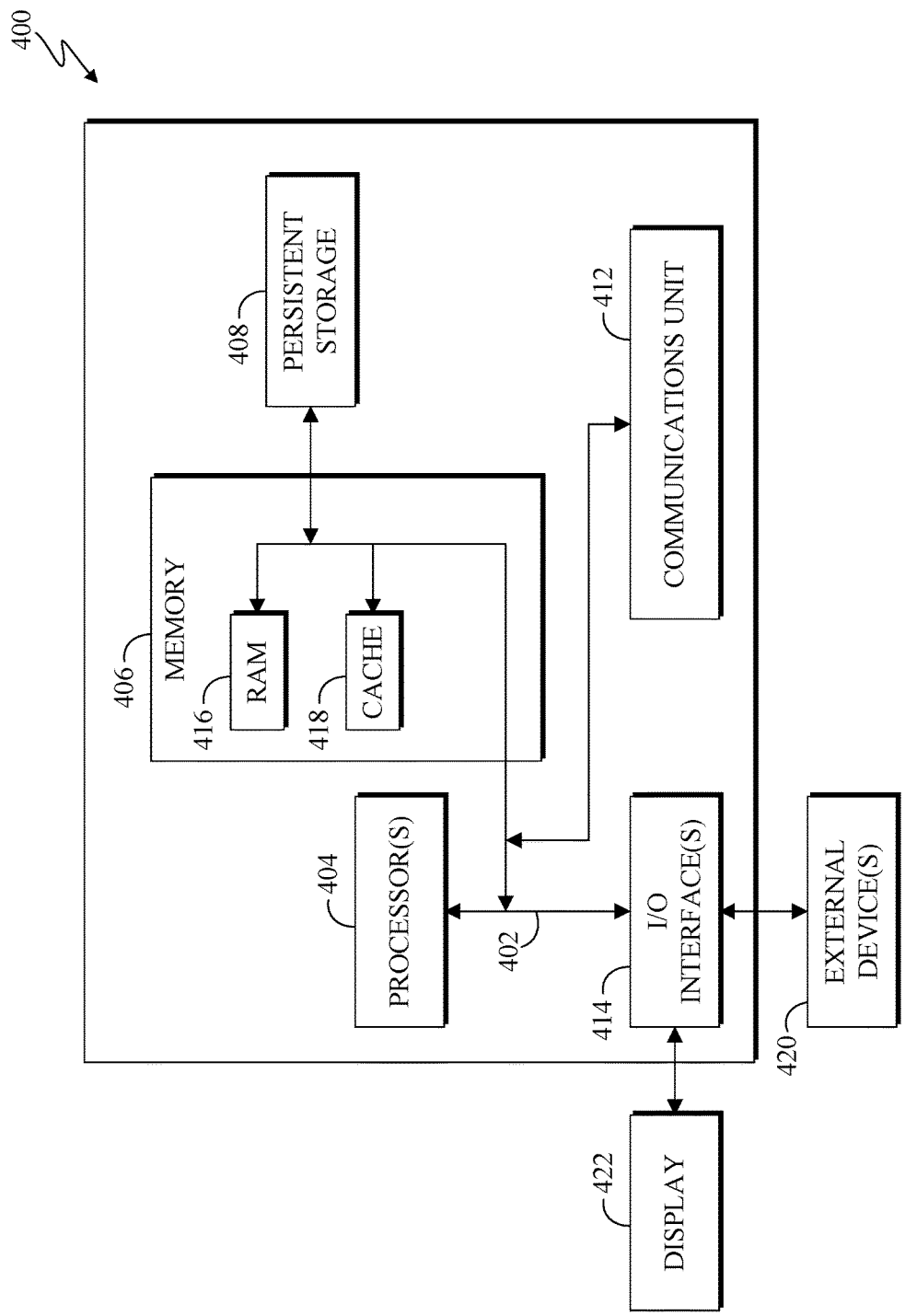
FIG. 4 depicts a block diagram of one example of a computer, in accordance with some embodiments of the present invention.

FIG. 4 depicts a block diagram of components of computer 400 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

As depicted, the computer 400 includes communications fabric 402, which provides communications between computer processor(s) 404, memory 406, persistent storage 408, communications unit 412, and input/output (I/O) interface(s) 414. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 416 and cache memory 418. In general, memory 406 can include any suitable volatile or non-volatile computer-readable storage media.

One or more programs may be stored in persistent storage 408 for access and/or execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 412, in these examples, provides for communications with other data processing systems or devices. In these examples, communications unit 412 includes one or more network interface cards. Communications unit 412 may provide communications through the use of either or both physical and wireless communications links.

I/O interface(s) 414 allows for input and output of data with other devices that may be connected to computer 400. For example, I/O interface 414 may provide a connection to external devices 420 such as a keyboard, keypad, a touch screen, and/or some other suitable input device. External devices 420 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 408 via I/O interface(s) 414. I/O interface(s) 414 also connect to a display 422.

Display 422 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computer/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computer/processing device receives computer readable program instructions from the network and forwards the computer readable program instructions for storage in a computer readable storage medium within the respective computer/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
   receiving a user inputted lower-level hierarchical filter key corresponding to a current search;
   responsive to receiving a user inputted lower-level hierarchical filter key, processing filter key relational data according to the user inputted lower-level hierarchical filter key to identify higher-level filter criteria keys associated with the user inputted lower-level hierarchical filter key;
   responsive to processing filter key relational data, updating higher-level filter criteria of the current search to include the identified higher-level filter criteria keys; and
   creating a dataset comprising one or more data items which fit the updated filter criteria.

2. The method of claim 1, further comprising receiving one or more implemented higher-level filter criteria keys corresponding to a hierarchical filter.

3. The method of claim 2, further comprising identifying a set of lower-level filter criteria options corresponding to the implemented higher-level filter criteria keys.

4. The method of claim 2, wherein receiving one or more higher-level filter criteria keys further includes receiving relational data corresponding to the one or more higher-level filter criteria.

5. The method of claim 4, wherein relational data includes data indicating one or more level filter criteria corresponding to each of the one or more higher-level filter criteria.

6. The method of claim 1, wherein updating higher-level filter criteria according to the lower-level filter key comprises amending the hierarchical filter criteria to reflect the higher-level filter criteria associated with the user inputted lower-level filter key.

7. The method of claim 4, wherein identifying a set of lower-level filter criteria according to the higher-level filter criteria comprises processing the received relational data to identify lower-level filter criteria associated with each of the received one or more higher-level filter criteria.

8. A computer program product comprising:
   a computer readable storage medium and program instructions stored on the computer readable storage medium, the program instructions comprising instructions to:
   receive a user inputted lower-level hierarchical filter key corresponding to a current search;
   responsive to receiving a user inputted lower-level hierarchical filter, process filter key relational data according to the user inputted lower-level hierarchical filter key to identify higher-level filter criteria keys associated with the user inputted lower-level hierarchical filter key;

responsive to processing filter key relational data, update higher-level filter criteria of the current search to include the identified higher-level filter criteria keys; and creating a dataset comprising one or more data items which fit the updated filter criteria.

9. The computer program product of claim 8, further comprising instructions to receive one or more implemented higher-level filter criteria keys corresponding to a hierarchical filter.

10. The computer program product of claim 9, further comprising instructions to identify a set of lower-level filter criteria options corresponding to the implemented higher-level filter criteria keys.

11. The computer program product of claim 9, wherein instructions to receive one or more higher-level filter criteria keys further comprise instructions to receive relational data corresponding to the one or more higher-level filter criteria.

12. The computer program product of claim 11, wherein relational data includes data indicating one or more level filter criteria corresponding to each of the one or more higher-level filter criteria.

13. The computer program product of claim 8, wherein instructions to update higher-level filter criteria according to the lower-level filter key comprise instructions to amend the hierarchical filter criteria to reflect the higher-level filter criteria associated with the user inputted lower-level filter key.

14. The computer program product of claim 11, wherein instructions to identify a set of lower-level filter criteria according to the higher-level filter criteria comprise processing the received relational data to identify lower-level filter criteria associated with each of the received one or more higher-level filter criteria.

15. A computer system comprising:
one or more computer processors;
a computer readable storage medium;
program instructions stored on the computer-readable storage media for execution by at least one of the one or more processors, the program instructions comprising instructions to:

receive a user inputted lower-level hierarchical filter key corresponding to a current search;

responsive to receiving a user inputted lower-level hierarchical filter, process filter key relational data according to the user inputted lower-level hierarchical filter key to identify higher-level filter criteria keys associated with the user inputted lower-level hierarchical filter key;

responsive to processing filter key relational data, update higher-level filter criteria of the current search to include the identified higher-level filter criteria keys; and create a dataset comprising one or more data items which fit the updated filter criteria.

16. The computer system of claim 15, further comprising instructions to receive one or more implemented higher-level filter criteria keys corresponding to a hierarchical filter.

17. The computer system of claim 16, further comprising instructions to identify a set of lower-level filter criteria options corresponding to the implemented higher-level filter criteria keys.

18. The computer system of claim 16, wherein instructions to receive one or more higher-level filter criteria keys further comprise instructions to receive relational data corresponding to the one or more higher-level filter criteria.

19. The computer system of claim 18, wherein relational data includes data indicating one or more level filter criteria corresponding to each of the one or more higher-level filter criteria.

20. The computer system of claim 15, wherein instructions to update higher-level filter criteria according to the lower-level filter key comprise instructions to amend the hierarchical filter criteria to reflect the higher-level filter criteria associated with the user inputted lower-level filter key.

* * * * *